US011618323B1

(12) United States Patent
Cooley (10) Patent No.: US 11,618,323 B1
(45) Date of Patent: Apr. 4, 2023

(54) SMART DISPLAY SHEETS (71) Applicant: Cooley Enterprises, LLC, Houston, TX (US)

(72) Inventor: Maryam Cooley, Houston, TX (US)

(73) Assignee: Cooley Enterprises, LLC, Houston, TX (US)

( * ) Notice: Subject to any disclaimer, the term of this patent is extended or adjusted under 35 U.S.C. 154(b) by 0 days.

(21) Appl. No.: 17/824,715

(22) Filed: May 25, 2022

(51) Int. Cl.
B60K 35/00 (2006.01)

(52) U.S. Cl.
CPC ...... B60K 35/00 (2013.01); B60K 2370/1533 (2019.05); B60K 2370/46 (2019.05); B60K 2370/52 (2019.05); B60K 2370/563 (2019.05); B60K 2370/794 (2019.05); B60K 2370/797 (2019.05); B60K 2370/816 (2019.05); B60K 2370/828 (2019.05); B60Y 2200/11 (2013.01)

(58) Field of Classification Search
CPC .............. B60K 35/00; B60K 2370/797; B60K 2370/816; B60K 2370/1533; B60K 2370/52; B60K 2370/794; B60K 2370/828; B60K 2370/46; B60K 2370/563; B60Y 2200/11
See application file for complete search history.

(56) References Cited

U.S. PATENT DOCUMENTS

| 10,018,882 | B2 | 7/2018 | Kwan et al. | |
|---|---|---|---|---|
| 10,417,941 | B1* | 9/2019 | Green | G09F 21/045 |
| 11,161,747 | B2 | 11/2021 | Guo | |
| 11,309,731 | B1* | 4/2022 | Velez | H02J 7/0044 |
| 2011/0258895 | A1* | 10/2011 | Rodgers, Jr. | G09F 21/04 40/447 |
| 2015/0168767 | A1* | 6/2015 | Yonemura | G02F 1/133308 349/58 |
| 2015/0362652 | A1* | 12/2015 | Hayashi | G02B 6/0088 348/790 |
| 2016/0209681 | A1* | 7/2016 | Hung | B32B 37/18 |
| 2018/0297540 | A1* | 10/2018 | Juhasz | A45C 3/001 |
| 2019/0001888 | A1* | 1/2019 | Labrot | B60J 1/20 |
| 2019/0130874 | A1* | 5/2019 | Wafford | G09G 5/373 |
| 2019/0213931 | A1* | 7/2019 | Brubaker | G06Q 30/0266 |
| 2020/0033661 | A1* | 1/2020 | Chien | H01L 23/562 |
| 2021/0054691 | A1* | 2/2021 | Ramirez | B60K 35/00 |
| 2021/0070174 | A1* | 3/2021 | Marutani | G09F 13/08 |
| 2021/0146851 | A1* | 5/2021 | Su | H01B 7/0045 |
| 2021/0241713 | A1* | 8/2021 | Vaarlid | G02F 1/163 |
| 2022/0111731 | A1* | 4/2022 | Zhao | B60K 37/06 |

OTHER PUBLICATIONS

Arceneaux, Ph.D., Jo Ann, Cytec Smart, Functional, & Protective: The Future of Coatings' Technology, Cytec Industries, Inc. (Smyrna, GA), Feb. 2013, 33 pages.

* cited by examiner

Primary Examiner — Christopher E Leiby
(74) Attorney, Agent, or Firm — Baker Botts L.L.P.

(57) ABSTRACT

A system includes a vehicle and a smart display sheet adhered to a component of the vehicle or integrally formed into a component of the vehicle, wherein the flexible smart display sheet is capable of displaying at least one image. The system may further include a substrate layer, a display panel disposed on the substrate layer, wherein the display panel is capable of displaying the at least one image, and a protective layer disposed on the display panel capable of protecting the at least one display panel from environmental elements. The system may further include an adhesive or magnetic layer that adheres the smart display sheet to the component of the vehicle.

26 Claims, 7 Drawing Sheets
(5 of 7 Drawing Sheet(s) Filed in Color)

SMART DISPLAY SHEETS

TECHNICAL FIELD

The present disclosure relates generally to display apparatuses, and more specifically to smart display sheets for displaying images.

BACKGROUND

An exterior appearance of a vehicle is usually chosen by the vehicle's owner to suit the owner's taste or a particular utility. A major part of how a vehicle appears on the exterior depends on the exterior paint job on the vehicle. In most cases, an exterior paint color of a vehicle (e.g., a car) is often chosen to represent a taste and/or personality of the vehicle's owner. In some cases, a vehicle is painted with text, patterns, pictures and other designs to suit a particular utility. For example, a company vehicle may be painted with a logo of the company to represent that the vehicle belongs to the company. A vehicle may be painted with advertising to promote a product or service.

The paint job on a vehicle is permanent and cannot be changed or modified without undertaking expensive repainting. In addition, repainting a vehicle is tedious, time consuming and typically requires the repainting job to be performed by skilled labor. For example, when an owner of a car wishes to change the exterior color of the car, the best option usually is to take the car to a professional paint shop to undergo time consuming and expensive repainting. One relatively cheaper and less time-consuming method to change the external appearance of a vehicle is vinyl wrapping which typically involves covering a vehicle's original paint with a vinyl film. Vinyl films come in different designs and colors. Colored vinyl wrapping involves placing an opaque vinyl film of a desired color on the body of the vehicle to personalize the color of the vehicle. Vinyl wraps are often used for advertising. For example, a vehicle can be wrapped with a custom-made advertising vinyl film having a company's logo, name and contact details. While vinyl wrapping is a relatively cheaper option for changing the visual appearance of a vehicle than re-painting the vehicle, vinyl wrapping is less durable and prone to damage from environment elements. Moreover, while vinyl wrapping is relatively easier to install on a vehicle as compared to repainting the vehicle, vinyl wrapping still is a semi-permanent solution and requires skilled labor for installing the wrapping.

Presently, no mechanism exists to change the visual appearance of a vehicle quickly and inexpensively.

BRIEF DESCRIPTION OF THE DRAWINGS

For a more complete understanding of this disclosure, reference is now made to the following brief description, taken in connection with the accompanying drawings and detailed description, wherein like reference numerals represent like parts. The patent or application file contains at least one drawing executed in color. Copies of this patent or patent application publication with color drawing(s) will be provided by the Office upon request and payment of the necessary fee.

DETAILED DESCRIPTION

Embodiments of the present disclosure provide apparatuses and methods for changing an external visual appearance of a vehicle quickly and inexpensively. Smart Display Sheet is a new and innovative technology that offers vehicle users instantaneous access to limitless options and combinations of colors, shapes, writings, lighting and customize designs. The technology allows for a vehicle user to express personality, life events, moods and opinions through tailored designs. The user can outfit the vehicle like changes in one's clothing, the ability to change immediate appearances, as often as it likes. As described in accordance with embodiments of the present disclosure, a smart display sheet may be adhered to or integrally formed into at least a portion of an externally visible component of a vehicle such as an outer body or wheels of the vehicle. The smart display sheet innovation can use pixel-based resolution display sheet images and/or path-line-based display sheet images. In the case of pixel base, the images are produced by pixels or tiny dots containing unique color and tonal information that come together to create the image on the vehicle's smart sheet. The quality of the pixel-based images is resolution dependent. The number of pixels that make up an image as well as how many of those pixels are displayed per inch, both determine the quality of a smart sheet display image on the vehicle. The more pixels in image and the higher the resolution of the smart sheet will create the higher quality of the display image will be. In the case of path-line smart display sheet, the technology will utilize line art, instead of trying to keep track of the millions of pixels in an image. This methodology keeps track of points and the equations for the lines that connect them. Generally, these images are made up of paths or line art that can be infinitely scalable because they work based on algorithms rather than pixels. Pixel and line art can be used independently or together on the same smart sheet display image of the vehicle. The smart display sheet is capable of displaying a wide variety of graphics including, but not limited to, solid colors, patterns, designs, text and lights. A user of the vehicle may control what image or images are displayed on the smart display sheet by using one of several methods described in embodiments of this disclosure. For example, the smart display sheet may be communicatively coupled to an infotainment system of the vehicle. A software application running on the infotainment system may provide a user interface on a console display that allows the user to select and/or generate images for displaying on the smart display sheet. Images selected or generated by the user may be displayed on the smart display sheet, thus changing the visual appearance of the vehicle as desired by the user substantially instantly. A vehicle in accordance with embodiments of the present disclosure may include a passenger car, a truck, a bus, an airplane, a boat, a ship or any means for transporting persons or goods.

The smart display sheets are capable of displaying variety of display resolutions that can range from low to high quality images including (e.g., High Definition (HD), Ultra High Definition (UHD), 4K resolution, 8K resolution, 16K resolution, and other future developed resolution technologies) that can imitate a high-quality paint job on a vehicle. For example, in one embodiment, when the entire outer body of a car is covered by one or more smart display sheets, a solid color displayed by the one or more smart display sheets may imitate the look and shine of a high-quality paint job such that it is indistinguishable from a similar car painted in the same color.

As described in accordance with embodiments of the present disclosure, a user of a vehicle may be provided with an almost endless selection of images including thousands of colors, designs, patterns, shapes, pictures, text, lighting effects and combinations thereof that the user can choose from for displaying on a smart display sheet of a vehicle installed, for example, on an outer body component or wheel of the vehicle. The user may also be provided with tools to generate customized images by using selected images and/or generating custom designs for displaying on a smart display sheet. This allows the user to change the appearance of a vehicle substantially instantly at the touch of a button and as often as the user desires, for example, to express the user's personality, opinions, and life events.

Figure 1A:
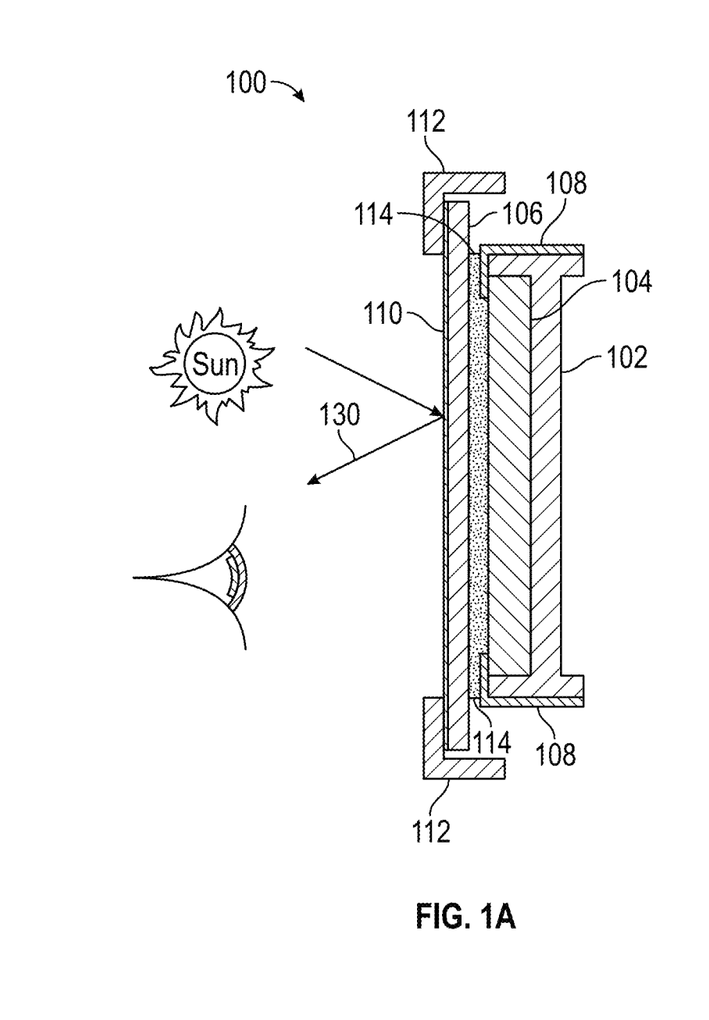
FIG. 1A illustrates a schematic diagram of an example smart display sheet, in accordance with one or more embodiments of the present disclosure.

FIG. 1A illustrates a schematic diagram of an example smart display sheet 100, in accordance with one or more embodiments of the present disclosure.

As shown in FIG. 1A, smart display sheet 100 includes a base substrate layer 102 and an electronic display panel 104 positioned on the substrate layer 102. The display panel 104 is capable of electrically displaying at least one image including, but not limited to, solid colors, patterns, designs, text and lighting. The display panel 104 may include one or more layers depending on the display technology used by the display panel 104 for displaying images. A display technology used by the display panel 104 may include, but is not limited to a Liquid Crystal Display (LCD), a backlit LCD, a plasma display, a Light Emitting Diode (LED) display, an Organic LED (OLED) display, High Definition (HD) display, Ultra High Definition (UHD) display, Full High Resolution (FHD), Quad High Resolution (QHD), 4K resolution display, 8K resolution display, 16K resolution display, Quantum UHD (QUHD), and a Quantum LED (QLED) display and combinations thereof as well as future developed high resolution technologies. It may be noted that the display panel 104 may use any present technology, future technology and combinations thereof to display images. For example, the display panel 104 may use the best display technology available at any time to achieve the highest possible image quality. In one embodiment, depending on the display technology used for displaying images, display panel 104 may include one or more layers including, but not limited to, one or more glass layers, one or more dielectric layers, one or more display electrode layers, one or more protective layers, one or more plasma cell layers, one or more polarizing filter layers, one or more liquid crystal layers, one or more backlighting layers, one or more color filter layers one or more coating layers and one or more capacitive layers. The substrate layer 102 may be made of any insulating material including, but not limited to, glass, porcelain, mica, plastics, some metal oxides or combinations thereof.

In one embodiment, the substrate layer 102 and the display panel 104 are held together by a thin solid or transparent frame 108. In an alternative or additional embodiment, the substrate layer 102 and the display panel 104 are held together by an adhesive layer (not shown) sandwiched between the substrate layer 102 and the display panel 104. In one embodiment, the adhesive layer that holds together the substrate layer 102 and the display panel 104 is a transparent adhesive layer.

In certain optional embodiments, smart display sheet 100 may include a transparent cover layer 106 disposed on top of the display panel 104. The cover layer 106 may be made of any transparent material that is flexible or can be molded into different shapes and sizes. For example, the cover layer 106 may be made of glass or transparent plastic. In certain embodiments, the cover layer 106 is designed to reduce reflections 130 (e.g., from the sun or other light sources) so that images displayed by the display panel 104 are clearly visible to onlookers. For example, the cover layer 106 may be made of glass having anti-reflective property and/or having an anti-reflective coating installed thereon that reduces reflections and improves quality of images displayed by the display panel 104. In certain embodiments, the cover layer 106 is adhered to the display panel 104 using a transparent adhesive layer 114.

In one or more embodiments, smart display sheet 100 includes a protective layer 110 disposed over the display panel 104 or the optional cover layer 106 (whichever the case may be) that can protect the smart display sheet 100 from environmental elements including, but not limited to, heat, cold, wind, ultraviolet rays, water, dust, snow, hail and stones. Protective layer 110 may include at least one coating of one or more materials including, but not limited to, a polytetrafluoroethylene (PTFE) coating, a Parylene coating, an Acrylic coating, a Silicone coating, a Polyurethane coating, an Epoxy Resin coating, and other future developed suitable coatings.

Figure 1B:
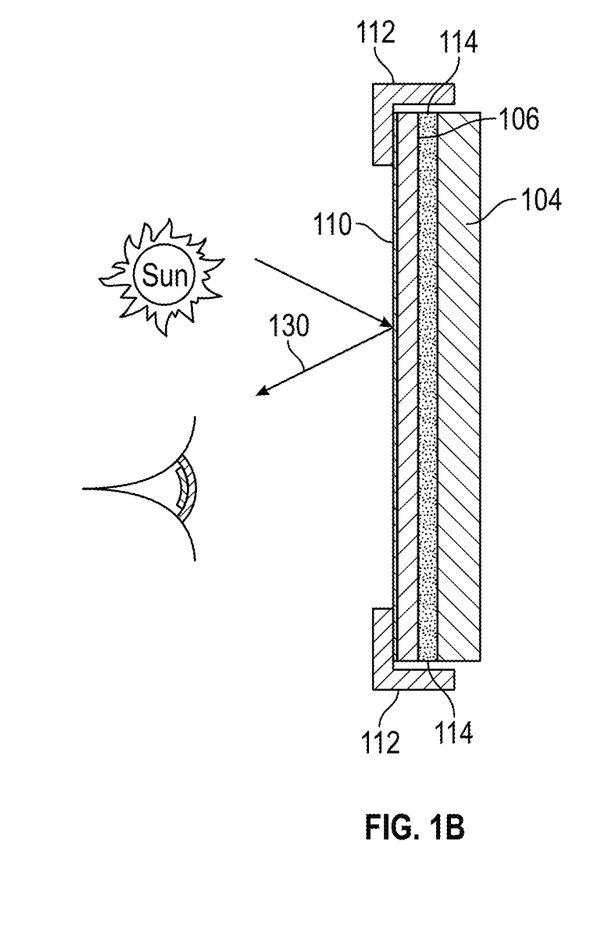
FIG. 1B illustrates a schematic diagram of an example smart display sheet of FIG. 1 without a separate substrate layer, in accordance with one or more embodiments of the present disclosure.

In one or more embodiments, smart display sheet 100 may not include the substrate layer 102 or the substrate layer 102 may be integrated into the display panel 104. FIG. 1B illustrates a schematic diagram of an example smart display sheet 100 of FIG. 1 without a separate substrate layer 102, in accordance with one or more embodiments of the present disclosure.

As shown in FIG. 1B, smart display sheet 100 does not include a separate substrate layer 102. As noted above, the substrate layer 102 may be integrated as part of the display panel 104, for example, as a base layer. In this case, there is no need for the frame 108 or an adhesive which would otherwise be needed to hold together the display panel 104 and the substrate layer 102.

Figure 1C:
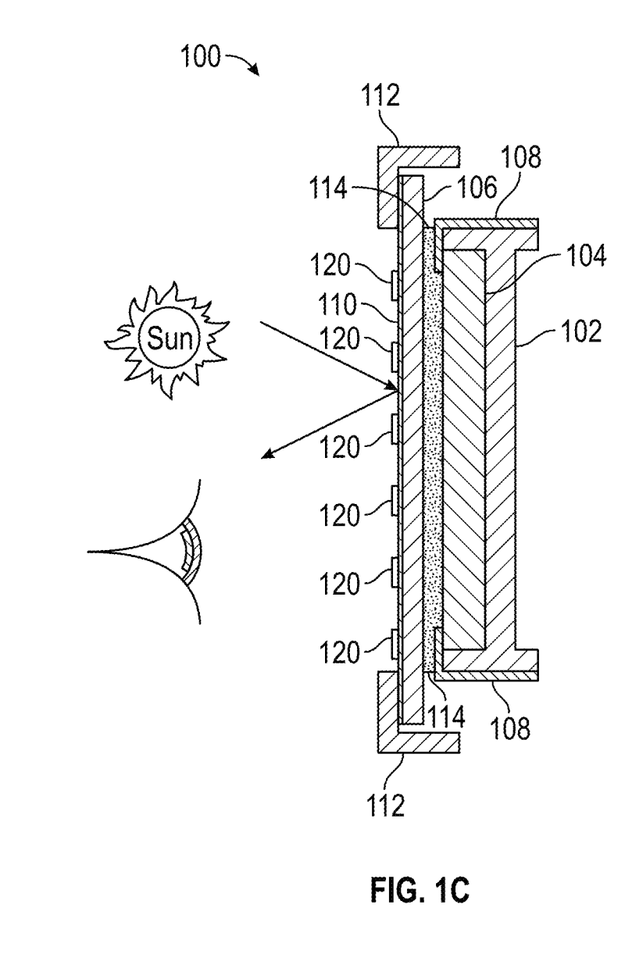
FIG. 1C illustrates a schematic diagram of an example smart display sheet of FIG. 1 with one or more solar devices, in accordance with one or more embodiments of the present disclosure.

In one or more embodiments, smart display sheet 100 may include one or more solar devices 120 (e.g., transparent solar sheets, solar lines etc.) that can trap solar energy of the sun and produce electrical power. The electrical power captured by the solar devices may be used to power, at least in part, the smart display sheet 100 and/or systems associated with the smart display sheet 100.

FIG. 1C illustrates a schematic diagram of an example smart display sheet 100 of FIG. 1 with one or more solar devices, in accordance with one or more embodiments of the present disclosure.

In one embodiment, the solar devices 120 are transparent or at least partially transparent, thus offering minimal obstruction to the view of the images displayed by the smart display sheet 100. Additional electrical power generated by the solar devices 120 may help reduce the power burden on the electrical circuit of the vehicle from which the smart display sheet 100 draws power for its functioning. The solar devices 120 may be adhered to or integrally formed into the outermost layer of the smart display sheet 100 such as the display panel 104, cover layer 106 or protective layer 110, whichever the case may be. In one embodiment, the solar devices 120 may be integrated on a transparent solar sheet (not shown) that is adhered using a transparent glue to the topmost layer of the smart display sheet 100. The solar devices can be applied to the entire vehicle or only in part to certain outer body parts exposed to capture maximum sunlight. Any excess energy captured from the solar system may be used to charge the battery in the case of Electric Vehicles.

In one or more embodiments, one or more layers of the smart display sheet 100 including the substrate layer 102, display panel 104, optional cover layer 106 and protective layer 110 are not attached to the adjacent layers or held in position by other means. For example, the substrate layer 102 may not be adhered to the display panel 104 using an adhesive layer or the substrate layer 102 and the display panel 104 are held together by a frame 108. Similarly, the cover layer 106 may not be adhered to the display panel 104 using the transparent adhesive layer 114. In such cases, an outer frame 112 may be used to hold together in position all layers of the smart display sheet 100.

In one or more embodiments, the smart display sheet 100 is moldable and/or flexible and can be take any desired shape. This means that all layers of the smart display sheet 100 described above including the substrate layer 102, the display panel 104, frame 108, cover layer 106 and protective layer 110 are moldable and/or flexible and can be take any desired shape. The ability of the smart display sheet 100 to be moldable and/or flexible and assume any shape allows the smart display sheet 100 to be installed flush with the contours of a vehicle component (e.g., body of the vehicle). In one or more alternative embodiments, one or more layers of the smart display sheet 100 may not be flexible but can be custom built to match the contours of the vehicle component over which they are installed. For example, the cover layer 106 may be made of inflexible glass but can be molded into the shape of the surface of the vehicle over which the smart display sheet 100 is to be installed.

Figure 1D:
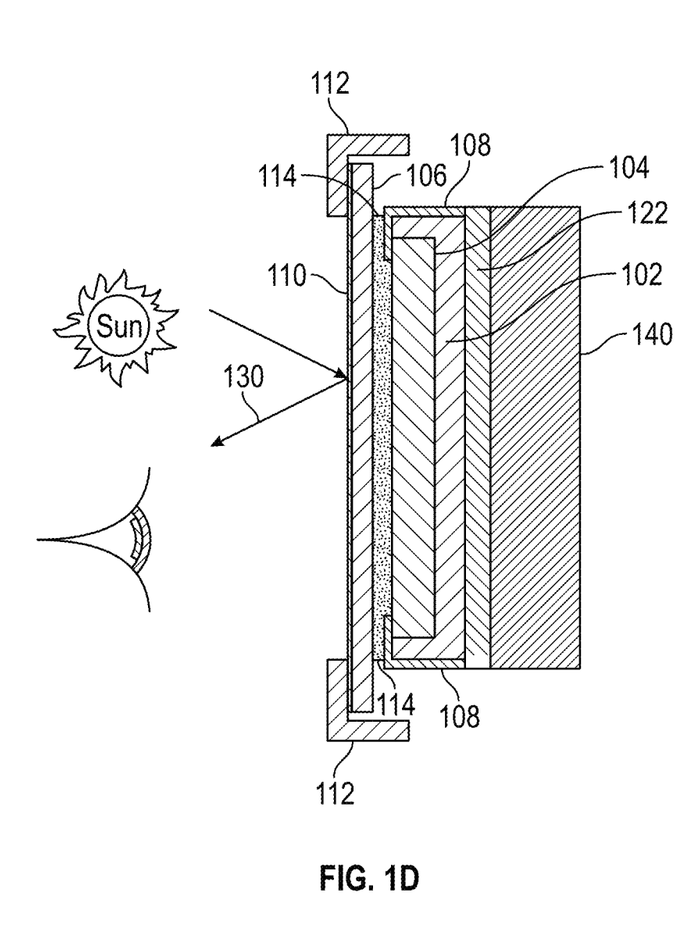
FIG. 1D illustrates an adhesive or magnetic layer that attaches the smart display sheet of FIG. 1 to a component of a vehicle, in accordance with embodiments of the present disclosure.

In one or more embodiments, the smart display sheet 100 may be adhered to a component (e.g., outer body, wheel etc.) of a vehicle using an adhesive. For example, FIG. 1D illustrates an adhesive layer 122 that attaches the smart display sheet 100 to a component 140 of a vehicle, in accordance with embodiments of the present disclosure. Vehicle component 140 may include but is not limited to an outer body of the vehicle, a wheel of the vehicle, and a removable part of the vehicle such as a removable convertible top and a removable rear spoiler. One or more of several types of known adhesives may be used for the adhesive layer 122 for adhering the smart display sheet 100 to the component 140 of a vehicle. Exemplary adhesives include, but are not limited to the adhesive layer comprises a Cyanoacrylate adhesive, a polyurethane adhesive, an acrylic-based adhesive, an epoxy-based adhesive, a urethane-based adhesive, a structural adhesive, tapes, films, threadlockers, flex glues, vehicle superglues, vehicle trim adhesives, plastic bonder adhesives, gap fillers, liquid gaskets or combinations thereof. As those of ordinary skill in the art will appreciate, combinations of two or more adhesives may be used for the adhesive layer 122.

In one or more embodiments, the smart display sheet 100 may be attached to a component (e.g., outer body panel, wheel etc.) of a vehicle using one or more magnets. For example, a magnetic layer may be affixed using an adhesive to the innermost layer of the smart display sheet 100 (e.g., the substrate layer or the display panel whichever the case may be), wherein the magnetic layer allows the smart display sheet 100 to be attached to a metal body component of a vehicle. Using magnets to attach the smart display sheet 100 to a vehicle component allows the smart display sheet 100 to be easily removable off the component which can simplify servicing or replacement of the smart display sheets 100.

In one or more alternative embodiments, smart display sheet 100 can be integrally formed into a component of a vehicle. For example, a smart display sheet 100 may be manufactured as an outermost layer of a vehicle component such as a vehicle exterior body component or a wheel.

Figure 2:
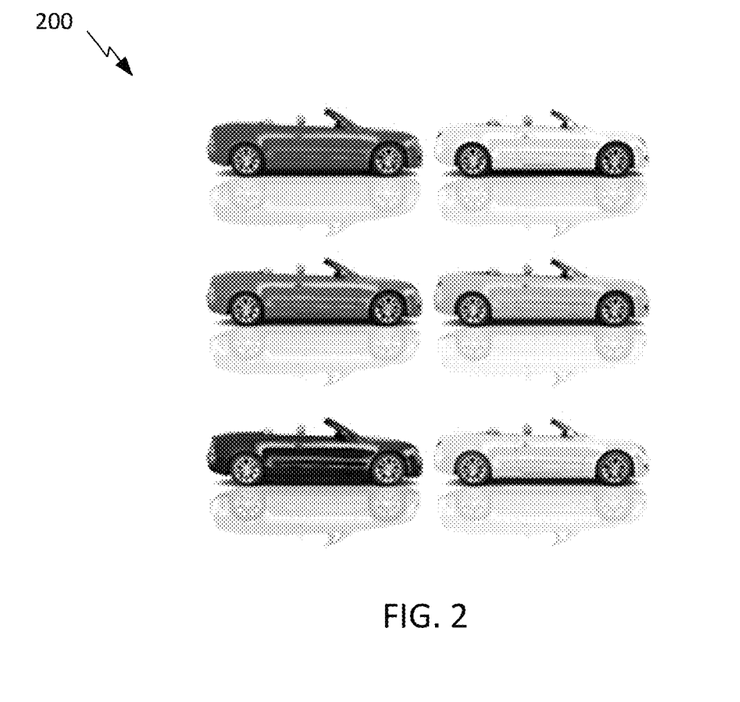
FIG. 2 is an example illustration of a smart display sheet of a car displaying different colors, in accordance with embodiments of the present disclosure.

FIG. 2 is an example illustration 200 of a smart display sheet of a car displaying different colors, in accordance with embodiments of the present disclosure. FIG. 2 shows six views of the same car displaying six different colors. In this context, a smart display sheet 100 may cover the entire outer body of the car so that a solid color may be displayed over the entire outer body of the car. This allows the outer body color of the car to be changed to a desired color substantially instantly with limitless color options to select from.

Figure 3:
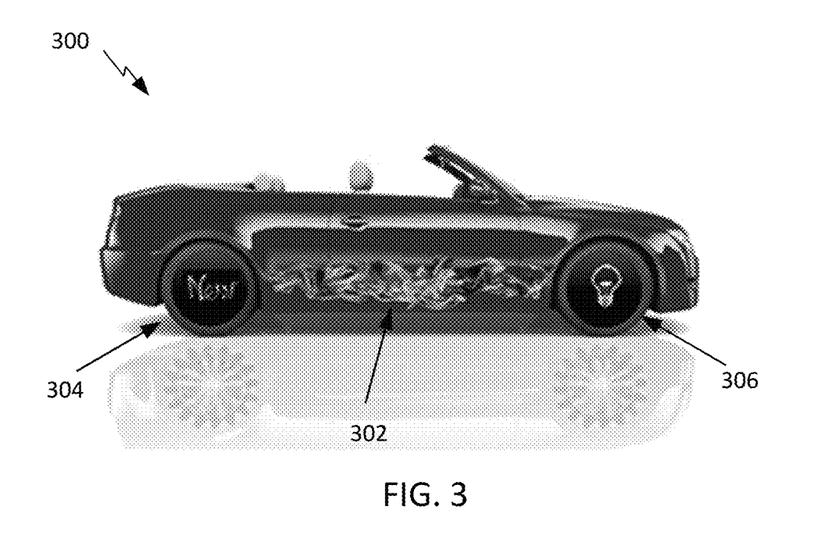
FIG. 3 is an example illustration of a car displaying a combination of images on several smart display sheets, in accordance with embodiments of the present disclosure.

FIG. 3 is an example illustration 300 of a car displaying a combination of images on several smart display sheets, in accordance with embodiments of the present disclosure. As shown in FIG. 2, a colored pattern 302 is displayed on an outer body portion of the car. In addition, images 304 and 306 are displayed on the wheels of the car. In one embodiment, a smart display sheet 100 may only cover a portion of a vehicle component. For example, to display the pattern 303, a smart display sheet 100 may cover the portion of the outer body of the car between the two wheels. Further, to display the images 304 and 306 on the respective wheels, a smart display sheet 100 may be in the form of a circular disc covering each wheel of the car.

Figure 4:
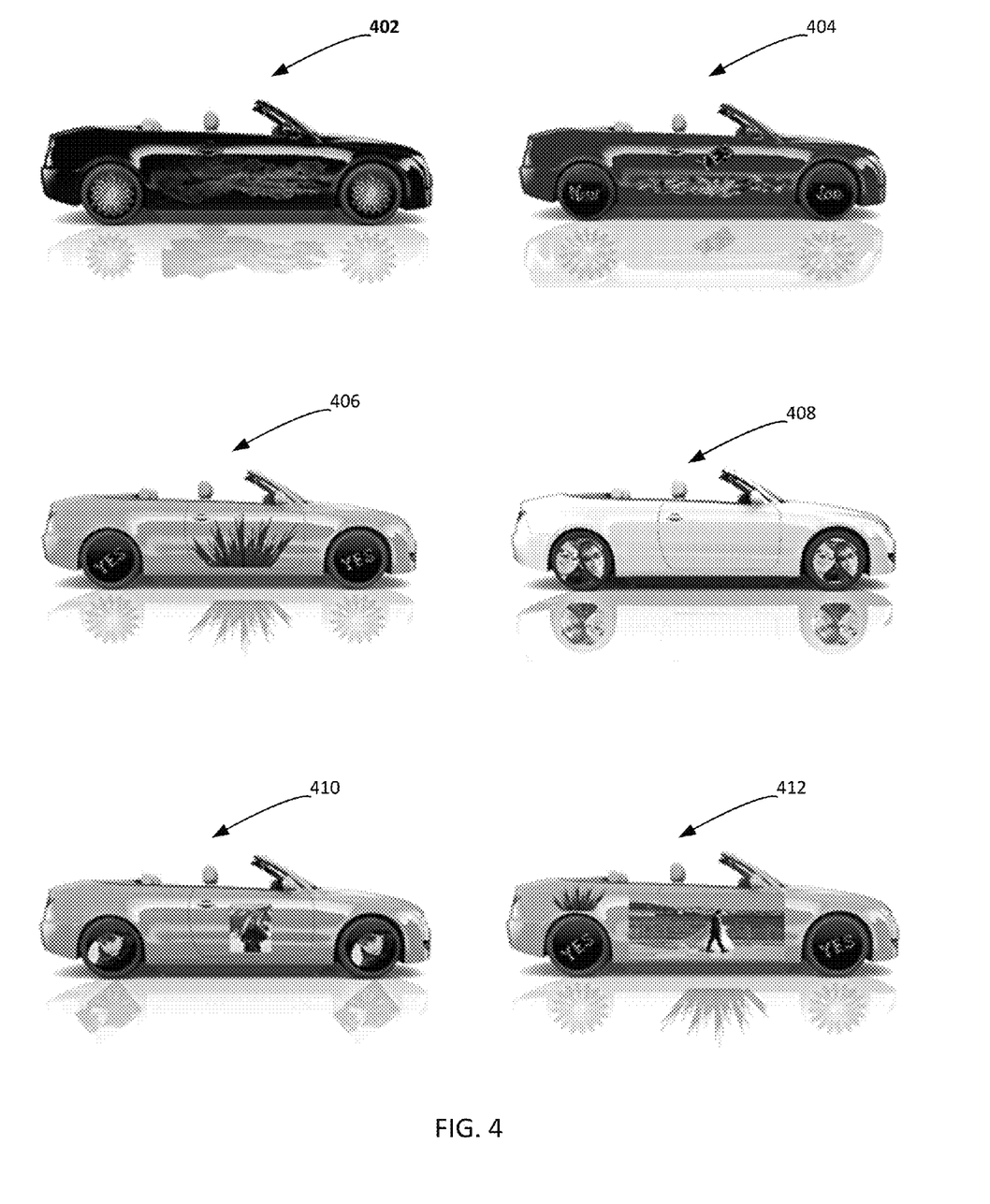
FIG. 4 illustrates example views of a car displaying a plurality of images on smart sheets, in accordance with embodiments of the present disclosure.

FIG. 4 illustrates example views of a car displaying a plurality of images on smart sheets, in accordance with embodiments of the present disclosure. FIG. 4 shows six views of the same car displaying six different combinations of images on one or more smart display sheets 100. View 402 shows patterns being displayed on the body and wheels of the car. View 404 and 406 show different patterns displayed on the body of the car and different textual designs displayed on the wheels of the car. View 408 and 410 show pictures being displayed on the body and wheels of the car.

View 412 shows a picture and a pattern being displayed on the body of the car and textual designs displayed on the wheels of the car. It may be noted that the base color of the car in each view may also be an image of a solid color. In this case, other images (e.g., patterns, textual designs, pictures etc.) are superimposed on the solid color image.

Figure 5:
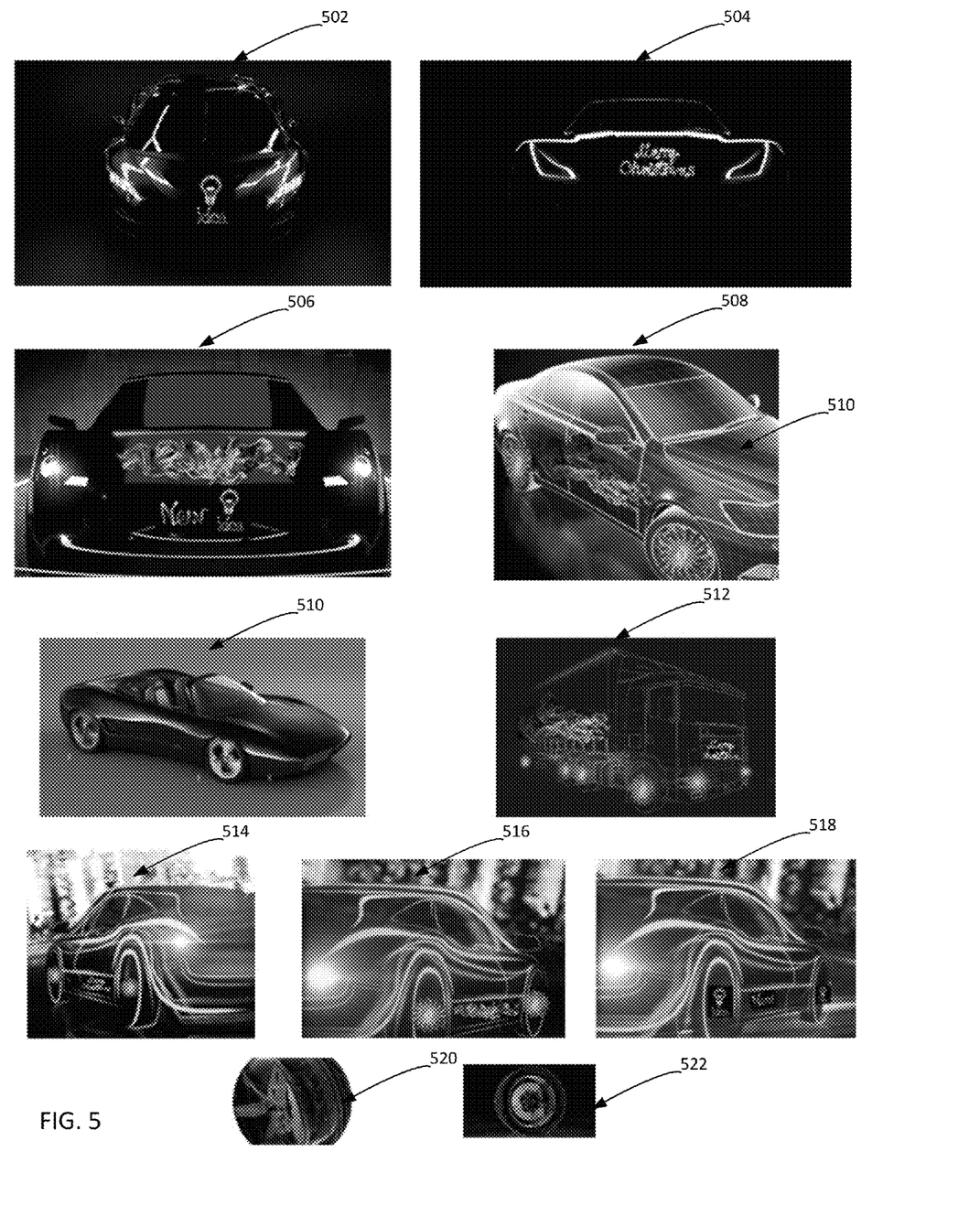
FIG. 5 illustrates example views of displaying a plurality of images on smart sheets, in accordance with embodiments of the present disclosure.

FIG. 5 illustrates example views of displaying a plurality of images on smart sheets, in accordance with embodiments of the present disclosure. FIG. 5 shows views of different vehicles displaying different combinations of images on one or more smart display sheets 100. View 502 shows an artistic pattern being displayed on the hood of a car. View 504 shows a holiday message being displayed on the hood of a car. View 506 shows a combination of a colorful pattern, a textual design and an artistic image being displayed on the hood of a car. View 508 shows colorful patterns being displayed on the body and wheels of a car. View 508 additionally shows a grid 510 of solar lines being displayed over the entire outer body of the car. View 510 shows colorful patterns being displayed on the wheels of the car. View 512 shows colorful patterns being displayed on the body and wheels of a truck and a holiday message being displayed in the front of the truck. Views 514, 516 and 518 show three different views of a car displaying lighting effects on the body of the car in combination with colorful patterns, textual designs, artistic images and messages. Views 520 and 522 show close up images of a wheel displaying several colors. It may be noted that in view 520, the colors are being displayed on the spokes of the wheel. This may be implemented by disposing several smart display sheets to cover the spokes only of the wheel and not the entire wheel.

It may be appreciated from FIGS. 2-5 that an outer visual appearance of a vehicle may be dramatically changed at will substantially instantly by displaying a combination of images on one or more smart display sheets 100 adhered to or integrally formed into components of the vehicle or portions thereof.

Figure 6:
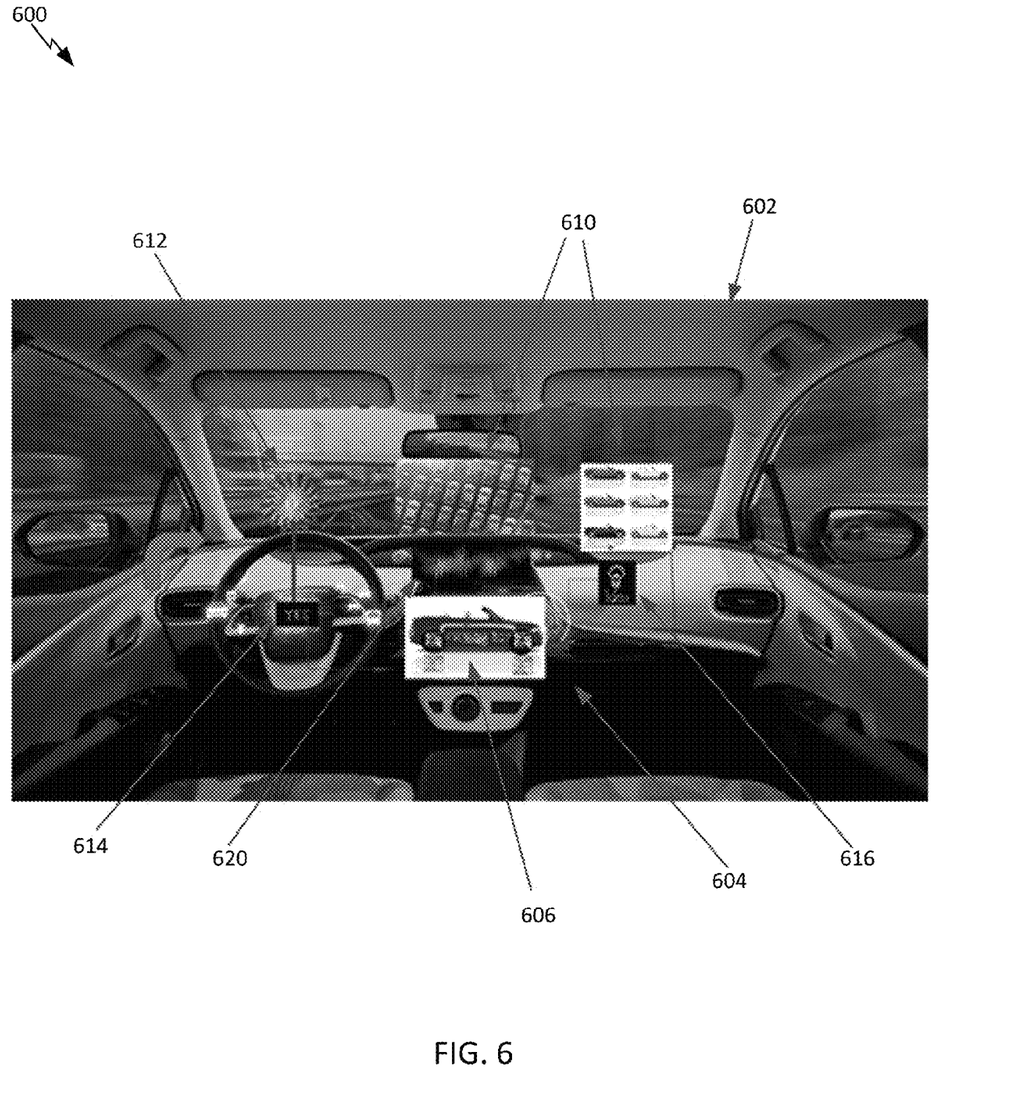
FIG. 6 illustrates an example system for selecting and/or generating images for displaying on one or more smart display sheets disposed on a vehicle component, in accordance with embodiments of the present disclosure.

Images may be displayed using several methods on a smart display sheet 100 adhered to a vehicle component 140 or integrally formed into a vehicle component 140. In one embodiment, the smart display sheet 100 may be communicatively coupled to a control console of a vehicle, wherein a user of the vehicle (e.g., owner of the vehicle 602 or another authorized user of the vehicle 602) may use the control console to select or generate one or more images for display on one or more smart display sheets disposed on a vehicle component 140.

FIG. 6 illustrates an example system 600 for selecting and/or generating images for displaying on one or more smart display sheets 100 disposed on a vehicle component 140, in accordance with embodiments of the present disclosure. As shown in FIG. 6 a vehicle 602 (e.g., a passenger car) includes a control console 604 as part of an infotainment system of the vehicle 602. The control console 604 may be communicatively coupled to one or more smart display sheets 100 adhered to or integrally formed into a component 140 of the vehicle 602. The control console 604 may be implemented by a computing device running one or more software applications. The computing device may include at least one processor and one or more memory devices, wherein the one or more memory devices may store software code/instructions which when executed by the processor implement functionality the control console 604 has been configured to perform. The one or more memory devices may additionally store data related to selecting and/or generating images, the data including, but not limited to, color palette, pictures, patterns, light effects, designs and alphanumeric characters. Control console 604 may be configured to allow a user to select and/or generate one or more images for display by one or more smart display sheets 100 of the vehicle 602. Control console 604 may provide a user interface that is operable by the user for selecting and/or generating images. As shown in FIG. 6, control console 604 may include a console display 606 which displays a graphical user interface the user can interact with. Control console 604 may provide several input and output methods as part of the user interface to enable the user to interact with the control console 604. For example, console display 606 may be a touch sensitive display allowing the user to interact with a graphical user interface displayed on the console display 606 using touch input. Additionally, or alternatively, control console 604 may include one or more buttons, knobs, touch pads etc., for the user to interact with the graphical user interface displayed on the console display 606. The control console 604 may include one or more display devices as part of the user interface, wherein the display device includes but are not limited to console display 606, a digital instrument cluster display and a heads-up display of the vehicle 602.

Control console 604 may be configured to run one or more software applications that allow a user of the vehicle 602 to select and/or generate images. For example, control console 604 may present a selection of colors, patterns, designs, text, lighting effects, pictures etc., on the console display 606 that can be displayed as images on one or more smart display sheets 100 of the vehicle 602. The user can select any one or a combination of images for display on a smart display sheet 100. As shown in FIG. 6, in one example, the user is presented with several representations/views 610 of the user's vehicle in different colors. In this case, the outer body of the vehicle is entirely covered with a smart display sheet 100. The user may select any one representation/view 610 based on a color preference of the user to change the outer body color of the vehicle to the selected color. In an additional or alternative embodiment, the console display 606 may present a color panel 620 to the user from which the user can select one or more colors to be displayed on a smart display sheet 100. In another example, as shown in FIG. 6, the user may select a wheel pattern 612 from a plurality of wheel patterns presented to the user on the console display 606. In this case, a smart display sheet 100 may cover at least a portion of one or more wheels of the vehicle 602. For example, a smart display sheet 100 may be in the form of a circular disc covering a wheel of the vehicle 602. The selected wheel pattern 612 may be displayed on at least one smart display sheet 100 of a wheel to change the appearance of the wheel. Similarly, in other examples, the user may select text 614 and other images 616 from a selection of text (e.g., in different designs) and images respectively for display on portions of one or more smart display sheets 100 covering different components of the vehicle 602.

In one or more embodiments, the user may select a combination of one or more colors, one or more designs, one or more patterns, one or more text, one or more lighting effects, one or more pictures etc. for displaying on several portions of one or more smart display sheets 100 covering different components of the vehicle 602. The control console 604 may allow the user to select a portion of a smart display sheet 100 that is to display each selected image. For example, as shown in FIG. 6, the console display 606 may display a view of the user's vehicle 602 with all image selections made by the user and potential areas of one or more smart display sheets 100 on the vehicle 602 that can display images. This allows the user to review the selections, update one or more selections and/or make new selections.

Once the user is happy with the image selections, the user may launch the selections (e.g., by pressing a button on the control console 604 or selecting an option on the console display 606) to display the selected images on the one or more smart display sheets 100.

In one or more embodiments, the control console 604 may be connected to a network such as the internet. The control console 604 may connect over the network to one or more servers or services that provide access to standard or custom images including but not limited to colors, pictures, patterns, light effects, designs and alphanumeric characters. This allows the user to download one or more images over the network from a server or service, for display on a smart display sheet 100.

In one or more embodiments, control console 604 may be configured to run a software application that allows the user to generate customized images for display on a smart display sheet 100 of the vehicle 602. For example, a software application running on the control console 604 may allow the user to write or draw on the console display 606 using a wireless stylus pen. Additionally, or alternatively, the user may select several images stored in a memory device of the control console 604 to build a custom image. In one embodiment, the control console 604 may allow the user to edit standard images stored in a memory device of the control console 604 to build a custom image. The custom images generated by the user may be displayed on a selected portion of a smart display sheet 100 of the vehicle 602.

Figure 7:
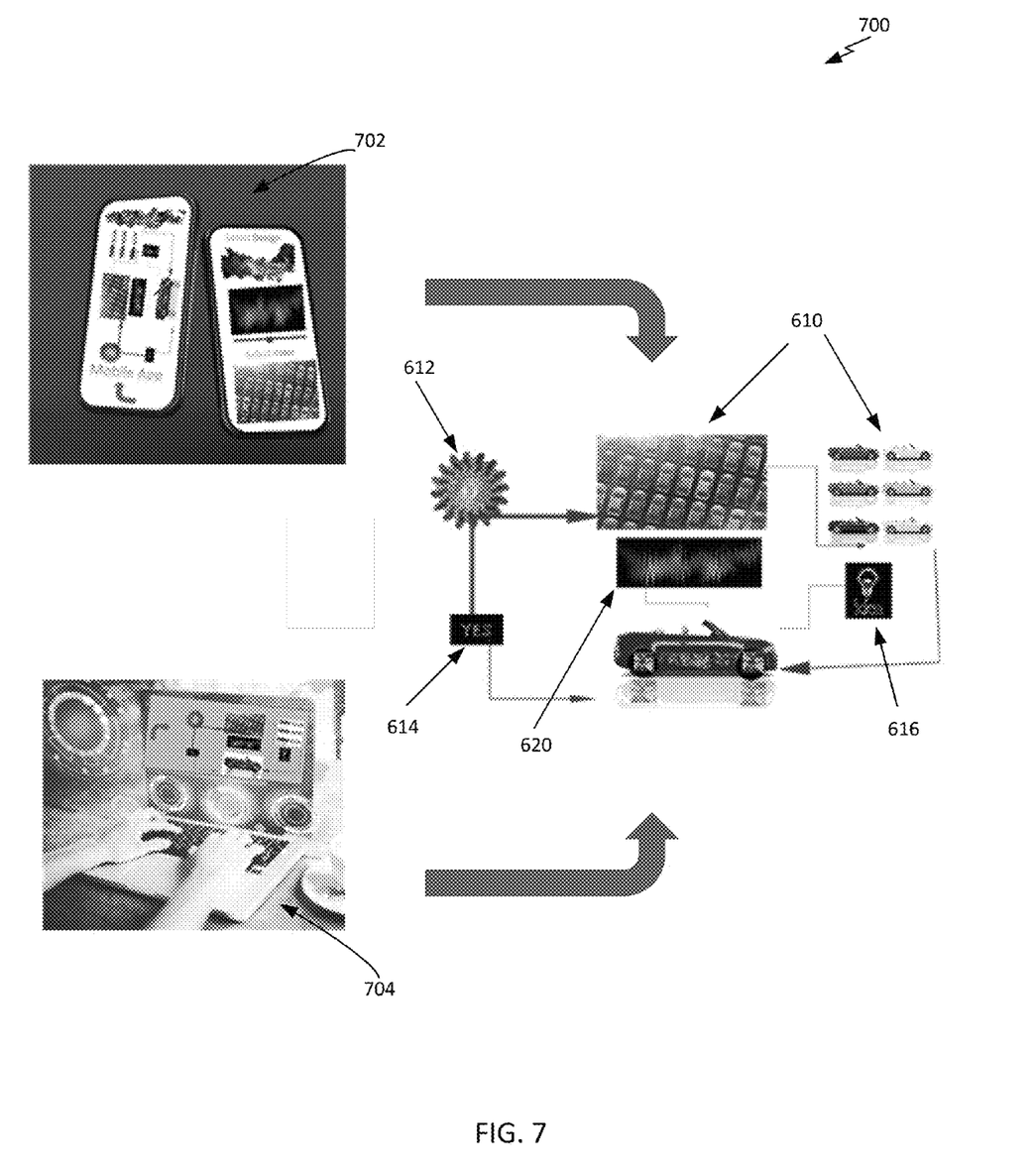
FIG. 7 illustrates an example system for selecting images and/or generating custom images for displaying on a smart display sheet, in accordance with embodiments of the present disclosure.

In one or more embodiments, the control console 604 may connect to a portable computing device (e.g., smartphone, tablet computer, laptop computer, etc.) using a wired or wireless connection. The portable computing device may run the same or similar software applications as are run by the control console 604 to allow the user to select images and/or generate custom images for displaying on one or more smart display sheets 100 of the vehicle 602. FIG. 7 illustrates an example system 700 for selecting images and/or generating custom images for displaying on a smart display sheet 100, in accordance with embodiments of the present disclosure. As shown in FIG. 7, a portable computing device such as a smartphone 702 and/or laptop computer 704 may be used to select images and/or generate images for displaying on a smart display sheet 100. The portable computing device may connect to the control console 604 of the vehicle 602 using a wireless communication protocol (e.g., Bluetooth, Wi-Fi, Near-Field communication (NFC) etc.) or a wired connection protocol (e.g., USB, Ethernet, lightning connector etc.). Each portable computing device may run software applications that allow a user (e.g., owner of the vehicle 602 or another authorized user of the vehicle 602) to select images and/or generate custom images for displaying on a smart display sheet 100 of the vehicle 602. The images may be stored in a local memory of the portable computing device or may be accessible to the portable computing device over a network (e.g., via the internet). In one embodiment, a portable computing device may access (e.g., wirelessly or over a wired connection) the images stored in a memory device of the control console 604 and select one or more images from the accessed images. The software applications run by the portable computing devices may be same as or similar to the software applications that may be run by the control console 604 as discussed with reference to FIG. 6. For example, a software application running on a portable computing device may present a graphical user interface that is similar to the graphical user interface presented by the control console 604 on the console display 606 of the vehicle 602. The methods of selecting images and generating custom images using a portable computing device are similar to the methods for selecting and generating images using the control console 604 as discussed in relation to FIG. 6 and will not be discussed again.

In one or more embodiments, a portable computing device or a non-portable computing device (e.g., a desktop computer) may remotely connect to the control console 604 of the vehicle 602 over the internet, and remotely send selected images and/or custom generated images to the control console 604 for displaying on a smart display sheet 100 of the vehicle 602.

It may be noted that FIG. 7 shows a smart phone 702 and laptop computer 704 as non-limiting examples of computing devices that can be used to select and/or generate images for displaying on a smart display sheet 100. A person having ordinary skill in the art can appreciate that any portable computing device capable of running software applications may be used to implement the methods discussed above.

In one or more embodiments, the smart display sheets 100 may piggyback off of the vehicle systems and use already existing vehicle components to run the smart display sheets 100. For example, a smart display sheet 100 may receive electrical power from an electrical power circuit of the vehicle that powers a plurality of electrical components of the vehicle. The control console 604 and the console display 606 discussed above with reference to FIG. 6 may be part of the infotainment system of the vehicle. For example, one or more processors and memory devices that are already built into the vehicle to support various vehicle systems may be used to implement the methods discussed above for selecting/generating and displaying images on the smart display sheets of the vehicle.

Embodiments of the present disclosure provide a system for displaying images on a surface of a vehicle. The system includes a vehicle and a molded or flexible smart display sheet adhered to a component of the vehicle or integrally formed into a component of the vehicle, wherein the molded or flexible smart display sheet is capable of displaying at least one image.

In one embodiment, the smart display sheet comprises a substrate layer; a display panel disposed on the substrate layer, wherein the display panel is capable of displaying the at least one image; and a protective layer disposed on the display panel capable of protecting the at least one display panel from environmental elements.

In one embodiment, the substrate layer is integrally formed into the display panel.

In one embodiment, the display panel comprises a plurality of display layers including one or more of:
  a Liquid Crystal Display (LCD), a backlit LCD, a plasma display, a Light Emitting Diode (LED) display, an Organic LED (OLED) display, High Definition (HD) display, Full High Resolution (FHD), Ultra High Definition (UHD) display, Quad High Resolution (QHD), 4K resolution display, 8K resolution display, 16K resolution display, Quantum UHD (QUHD), and a Quantum LED (QLED) display and combinations thereof
  As those of ordinary skill in the art will appreciate, any future developed display material may be used at the displayed layer.7

In one embodiment, the smart display sheet further comprises an adhesive layer that adheres the smart display sheet to the component of the vehicle.

In one embodiment, the adhesive layer comprises a Cyanoacrylate adhesive, a polyurethane adhesive, an acrylic-based adhesive, an epoxy-based adhesive, a urethane-based adhesive, a structural adhesive, tapes, films, threadlockers, flex glues, vehicle superglues, vehicle trim adhesives, plastic bonder adhesives, gap fillers, liquid gaskets or combinations thereof.

In one embodiment, the smart display sheet further comprises at least one solar device adhered to the display panel or integrally formed into the display panel, wherein the at least one solar device captures solar energy of the sun and converts the captured solar energy into electrical power, wherein the electrical power generated by the at least one solar device at least partially powers the smart display sheet.

In one embodiment, the at least one solar device is at least partially transparent.

In one embodiment, the vehicle comprises a car; and the smart display sheet is adhered to at least a portion of an outer body of the car or at least a portion of one or more wheels of the car.

In one embodiment, the system further comprises a control console of the vehicle communicatively coupled to the smart display sheet, wherein the control console is part of an infotainment system of the vehicle and controls the images displayed by the smart display sheet; and a console display of the control console, wherein the control console is configured to allow a user to perform one or more of select an image from a plurality of images displayed on the console display and generate a customized image on the console display, wherein one or more of the selected image and the customized image is displayed by the smart display sheet.

In one embodiment, the smart display sheet receives electrical power from an electrical power circuit of the vehicle that powers a plurality of electrical components of the vehicle.

In one embodiment, the smart display sheet partially covers a component of the vehicle.

In one embodiment, the vehicle is selected from a group consisting of a passenger car, a truck, a bus, an airplane, a boat and a ship.

In one embodiment, the at least one image may comprise one or more colors, one or more pictures, one or more patterns, light at one or more intensities, one or more alphanumeric characters and combinations thereof.

In one embodiment, the component comprises a removable body part of the vehicle.

Embodiments of the present disclosure provide a system for displaying images on a surface of a car. The system includes a car, a flexible or molded smart display sheet adhered to a component of the car, wherein the flexible or molded smart display sheet is capable of displaying at least one image, wherein the smart display sheet comprises: a substrate layer; a display panel disposed on the substrate layer, wherein the display panel is capable of displaying the at least one image; and a protective layer disposed on the display panel capable of protecting the at least one display panel from environmental elements; and the an adhesive layer that adheres the smart display sheet to the component of the vehicle.

In one embodiment, the substrate layer is integrally formed into the display panel.

In one embodiment, the system further comprises a control console of the car communicatively coupled to the smart display sheet, wherein the control console is part of an infotainment system of the car and controls the images displayed by the smart display sheet; and a console display of the control console, wherein the control console is configured to allow a user to perform one or more of select an image from a plurality of images displayed on the console display and generate a customized image on the console display, wherein one or more of the selected image and the customized image is displayed by the smart display sheet.

Embodiments of the present disclosure provide a system for displaying images on a surface of a car. The system includes a car, a smart display sheet which may or may not be flexible adhered to a component of the car, wherein the smart display sheet is capable of displaying at least one image, wherein the smart display sheet comprises: a display panel disposed on the substrate layer, wherein the display panel is capable of displaying the at least one image; and a protective layer disposed on the display panel capable of protecting the at least one display panel from environmental elements; and an adhesive layer that adheres the smart display sheet to the component of the vehicle.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for displaying images on a surface of a vehicle, comprising:
   the vehicle; and
   a smart display sheet adhered to a component of the vehicle or integrally formed into a component of the vehicle, wherein the smart display sheet is capable of displaying at least one image, wherein the component is an outer body panel or wheel of the vehicle, wherein the smart display sheet comprises:
   a substrate layer comprising a recess;
   a display panel disposed within the recess of the substrate layer, wherein the display panel is capable of displaying the at least one image;
   a transparent cover layer disposed on the display panel;
   a frame disposed against an exterior surface of the substrate layer, wherein the frame comprises a retainer lip configured to hold the display panel within the recess of the substrate layer; and
   a protective layer disposed adjacent to the transparent cover layer and capable of protecting the at least one display panel from environmental elements comprising heat and cold.

2. The system of claim 1, wherein the smart display sheet is capable of displaying limitless combinations of still and animated colors, patterns, shapes, text, lighting, and/or customized designs and combinations thereof.

3. The system of claim 1, wherein the display panel comprises at least one display layer comprising one or more of a Liquid Crystal Display (LCD), a backlit LCD, a plasma display, a Light Emitting Diode (LED) display, an Organic LED (OLED) display, High Definition (HD) display, Full High Resolution (FHD), Ultra High Definition (UHD) display, Quad High Resolution (QHD), 4K resolution display, 8K resolution display, 16K resolution display, Quantum UHD (QUHD), and a Quantum LED (QLED) display and combinations thereof.

4. The system of claim 1, wherein the substrate layer is integrally formed into the display panel.

5. The system of claim 1, wherein the smart display sheet is attachable to the component of the vehicle via one or more magnets.

6. The system of claim 1, wherein the smart display sheet comprises an adhesive configured to attach the smart display sheet to the component of the vehicle, wherein the adhesive comprises a Cyanoacrylate adhesive, a polyurethane adhesive, an acrylic-based adhesive, an epoxy-based adhesive, a urethane-based adhesive, a structural adhesive, tapes, films, threadlockers, flex glues, vehicle superglues, vehicle trim adhesives, plastic bonder adhesives, Gap fillers, liquid gaskets or combinations thereof.

7. The system of claim 1, wherein the smart display sheet further comprises at least one solar device adhered to the display panel or integrally formed into the display panel, wherein the at least one solar device captures solar energy of the sun and converts the captured solar energy into electrical power, wherein the electrical power generated by the at least one solar device at least partially powers the smart display sheet.

8. The system of claim 7, wherein the at least one solar device is at least partially transparent.

9. The system of claim 1, wherein:
the vehicle comprises a car; and
the smart display sheet is adhered to at least a portion of an outer body of the car or at least a portion of one or more wheels of the car.

10. The system of claim 1, further comprising:
a control console of the vehicle communicatively coupled to the smart display sheet, wherein the control console is part of an infotainment system of the vehicle and controls the images displayed by the smart display sheet; and
a console display of the control console, wherein the control console is configured to allow a user to perform one or more of selecting an image from a plurality of images displayed on the console display and generate a customized image on the console display,
wherein one or more of the selected images and the customized image is displayed by the smart display sheet.

11. The system of claim 1, wherein the smart display sheet receives electrical power from an electrical power circuit of the vehicle that powers a plurality of electrical components of the vehicle.

12. The system of claim 1, wherein the smart display sheet partially covers the component of the vehicle.

13. The system of claim 1, wherein the vehicle is selected from a group consisting of a passenger car, a truck, a bus, an airplane, a boat and a ship.

14. The system of claim 1, wherein the at least one image may comprise one or more colors, one or more pictures, one or more patterns, light at one or more intensities, one or more alphanumeric characters and combinations thereof.

15. The system of claim 1, wherein the component comprises a removable body part of the vehicle.

16. The system of claim 1, wherein the protective layer comprises a coating of one or more materials.

17. The system of claim 16, wherein the one or more materials comprise at least one coating selected from the group consisting of a polytetrafluoroethylene coating, a Parylene coating, an Acrylic coating, a Silicone coating, a Polyurethane coating, and an Epoxy Resin coating.

18. The system of claim 1, wherein the component is the outer body panel, the outer body panel being a metal body component.

19. The system of claim 18, wherein the smart display sheet is attached to the metal body component with one or more magnets.

20. The system of claim 1, wherein the smart display sheet is manufactured as an outermost layer of the component, wherein the component is the exterior body panel.

21. The system of claim 1, wherein the smart display sheet is not positioned over windows of the vehicle.

22. The system of claim 1, wherein the component is the wheel of the vehicle, wherein the smart display sheet is in the form a disc at least partially covering the wheel.

23. A system for displaying images on a surface of a car, comprising:
the car; and
a smart display sheet adhered to a component of the car, wherein the component is an outer body panel or wheel of the car, wherein the smart display sheet is capable of displaying at least one image, and wherein the smart display sheet comprises:
a substrate layer comprising a recess;
a display panel disposed within the recess of the substrate layer, wherein the display panel is capable of displaying the at least one image;
a transparent cover layer disposed on the display panel; and
a protective layer disposed adjacent to the transparent cover layer and capable of protecting the at least one display panel from environmental elements comprising heat and cold; and
an outer frame configured to hold together the substrate layer, the display panel, the transparent cover layer, and the protective layer.

24. The system of claim 23, wherein the substrate layer is integrally formed into the display panel.

25. The system of claim 23, further comprising:
a control console of the car communicatively coupled to the smart display sheet, wherein the control console is part of an infotainment system of the car and controls the images displayed by the smart display sheet; and
a console display of the control console, wherein the control console is configured to allow a user to perform one or more of select an image from a plurality of images displayed on the console display and generate a customized image on the console display,
wherein one or more of the selected images and the customized image is displayed by the smart display sheet.

26. A system for displaying images on a surface of a car, comprising:
the car; and a smart display sheet adhered to a component of the car, wherein the component is an outer body panel or wheel of the car, wherein the smart display sheet is capable of displaying at least one image, wherein the smart display sheet comprises:
- a substrate layer securable to the component of the car, wherein the substrate layer comprises a recess;
- a display panel disposed within the recess of the substrate layer, wherein the display panel is capable of displaying the at least one image, and wherein the substrate layer and the display panel each comprise a flexible material configured to conform to a shape of the component of the car;
- a frame disposed against an exterior surface of the substrate layer, wherein the frame is configured to hold the display panel within the recess of the substrate layer;
- a transparent cover layer disposed on the display panel;
- a transparent adhesive layer extending over the display panel and configured to adhere the transparent cover layer to the display panel;
- a protective layer disposed over the transparent cover layer, wherein the protective layer is capable of protecting the at least one display panel from environmental elements comprising heat and cold; and
- an outer frame configured to hold together the substrate layer, the display panel, the transparent cover layer, and the protective layer; and an adhesive or magnetic material that attaches the smart display sheet to the component of the vehicle.

* * * * *